Figure 6:
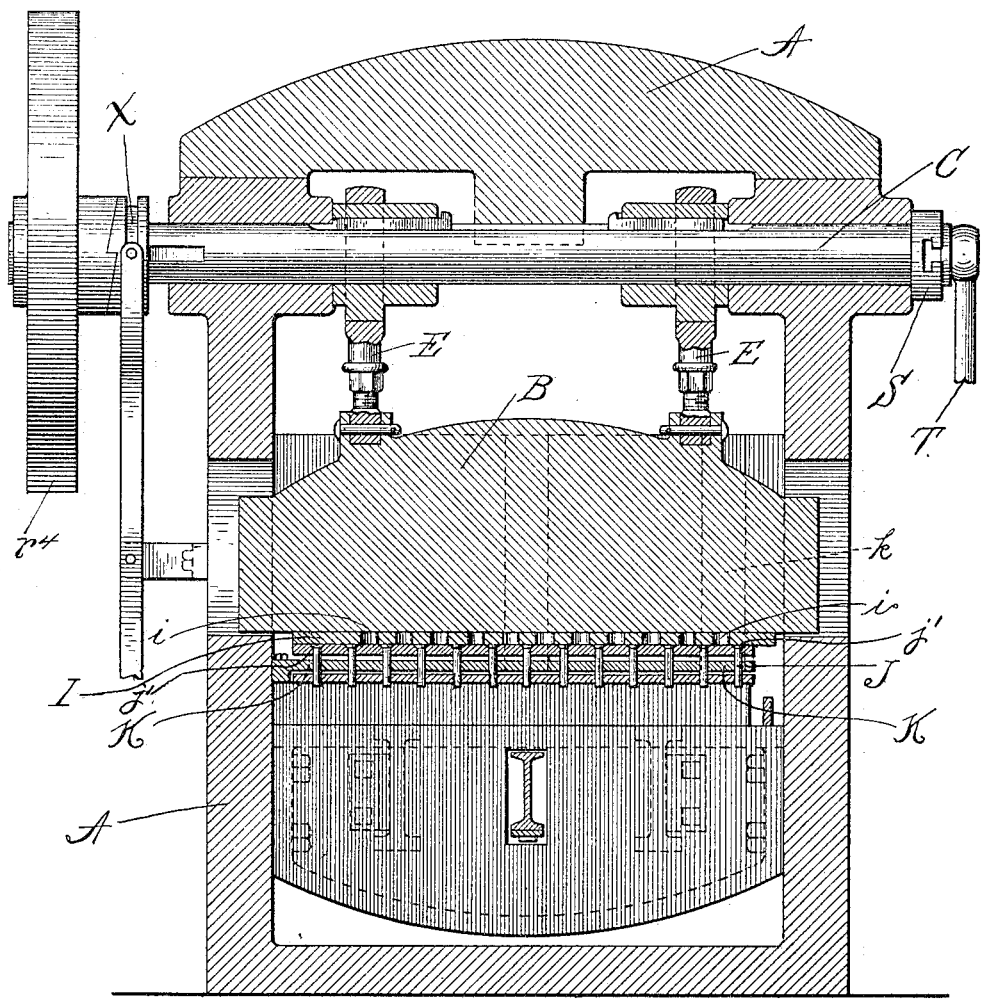

No. 793,051. PATENTED JUNE 27, 1905.
G. B. CHAPMAN.
PUNCHING MACHINE.
APPLICATION FILED APR. 3, 1902.
7 SHEETS—SHEET 1.
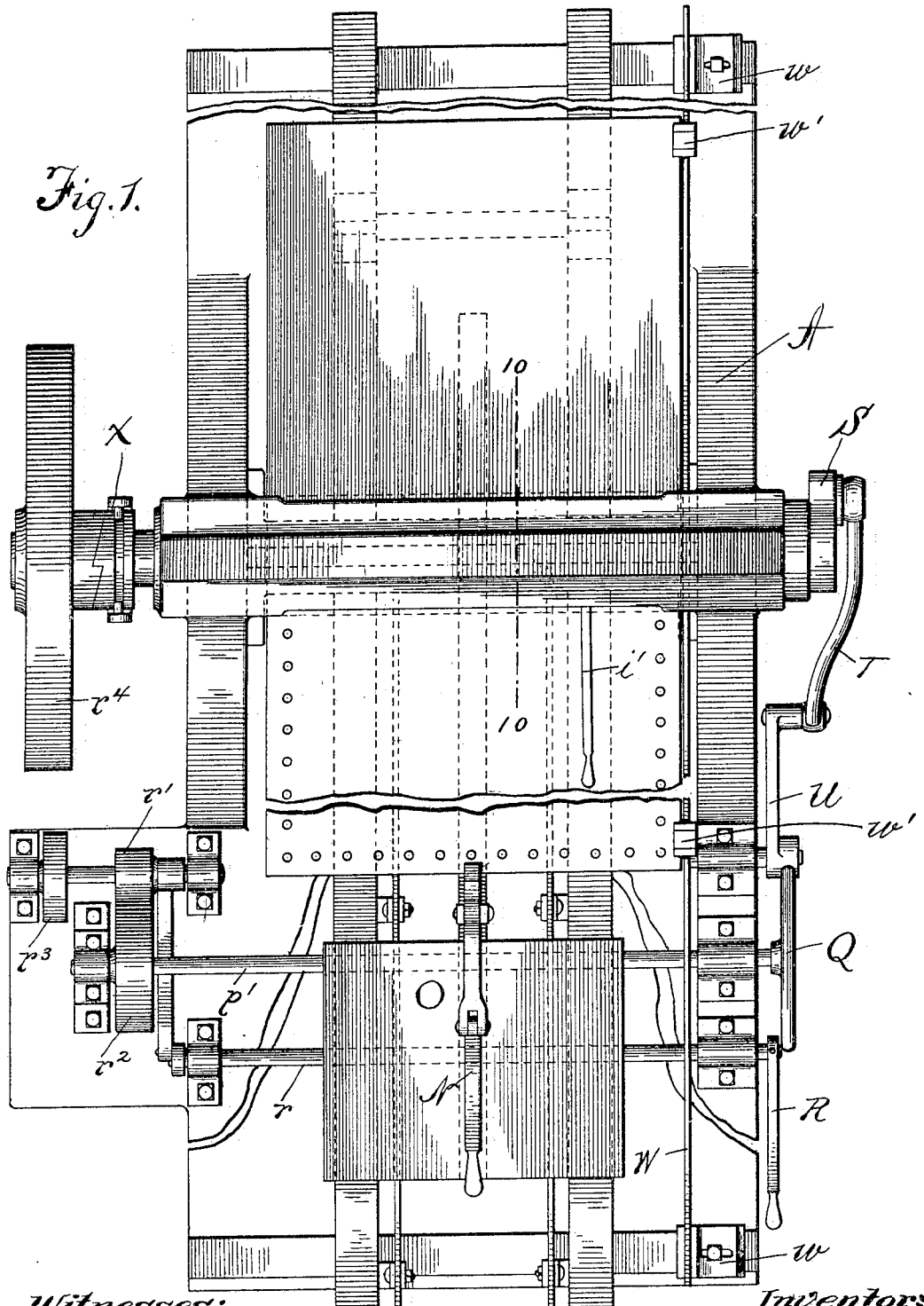

No. 793,051. PATENTED JUNE 27, 1905.
G. B. CHAPMAN.
PUNCHING MACHINE.
APPLICATION FILED APR. 3, 1902.
7 SHEETS—SHEET 2.
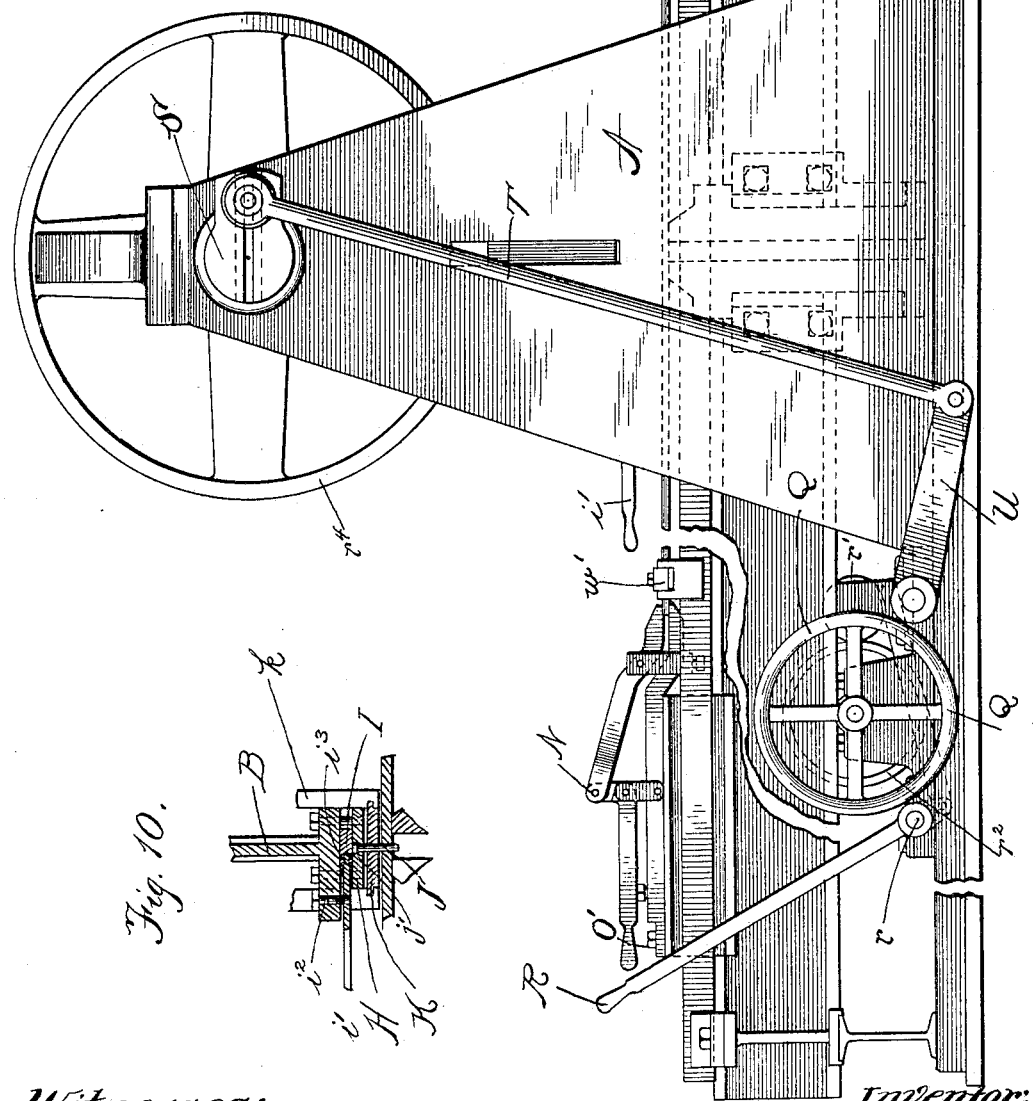
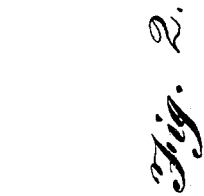
Witnesses:
Ora D. Perry
J B Weir
Inventor:
George B. Chapman,
By Charles S. Hill, his Atty.

No. 793,051. PATENTED JUNE 27, 1905.
G. B. CHAPMAN.
PUNCHING MACHINE.
APPLICATION FILED APR. 3, 1902.
7 SHEETS—SHEET 3.
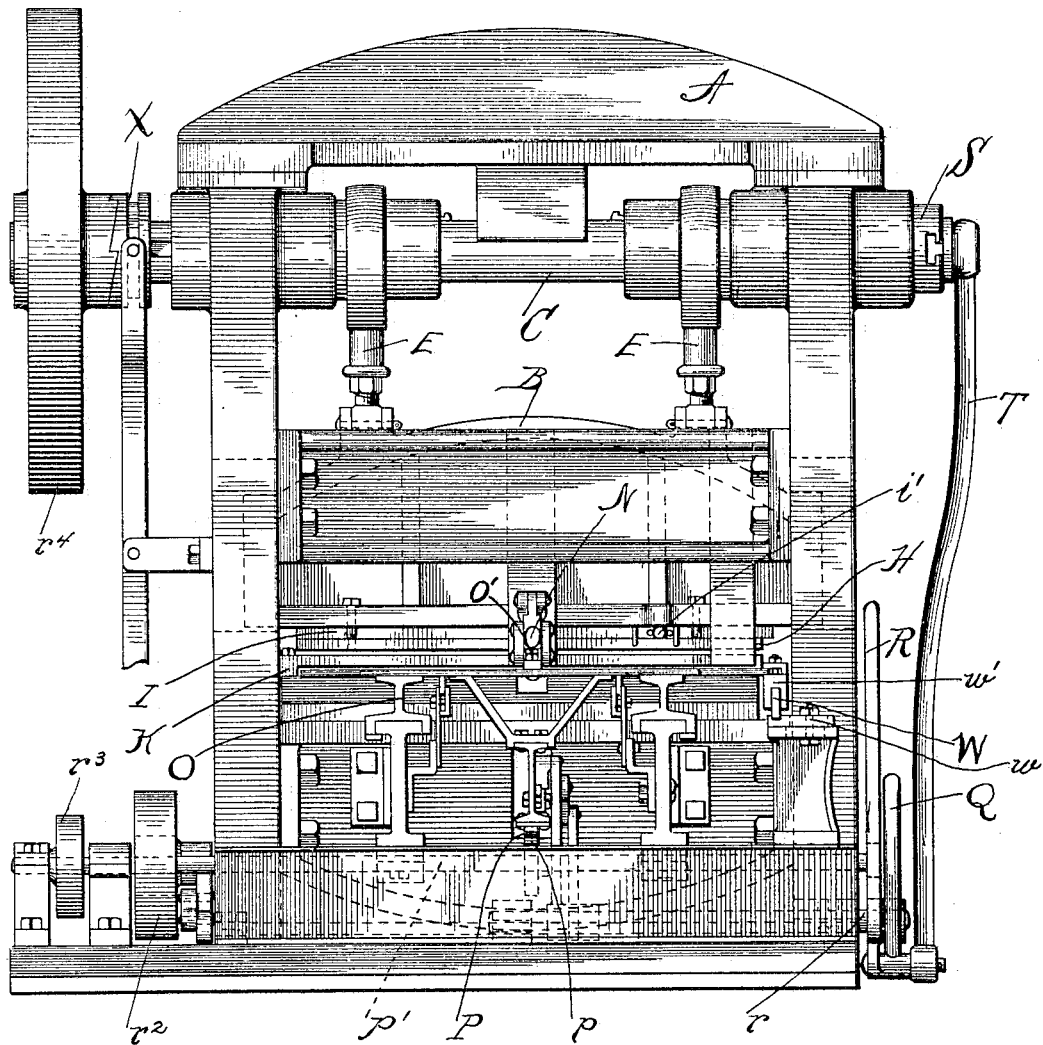

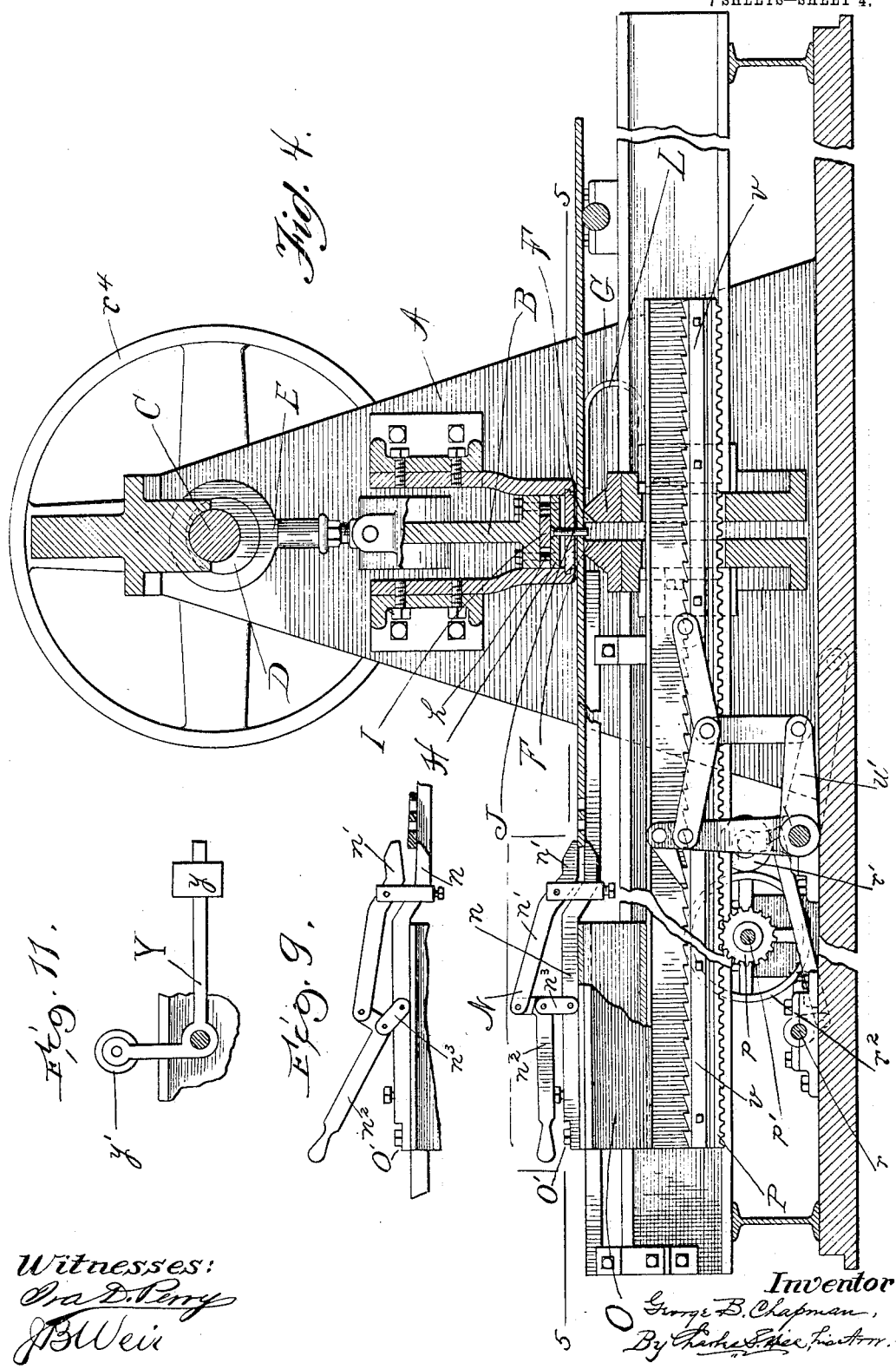

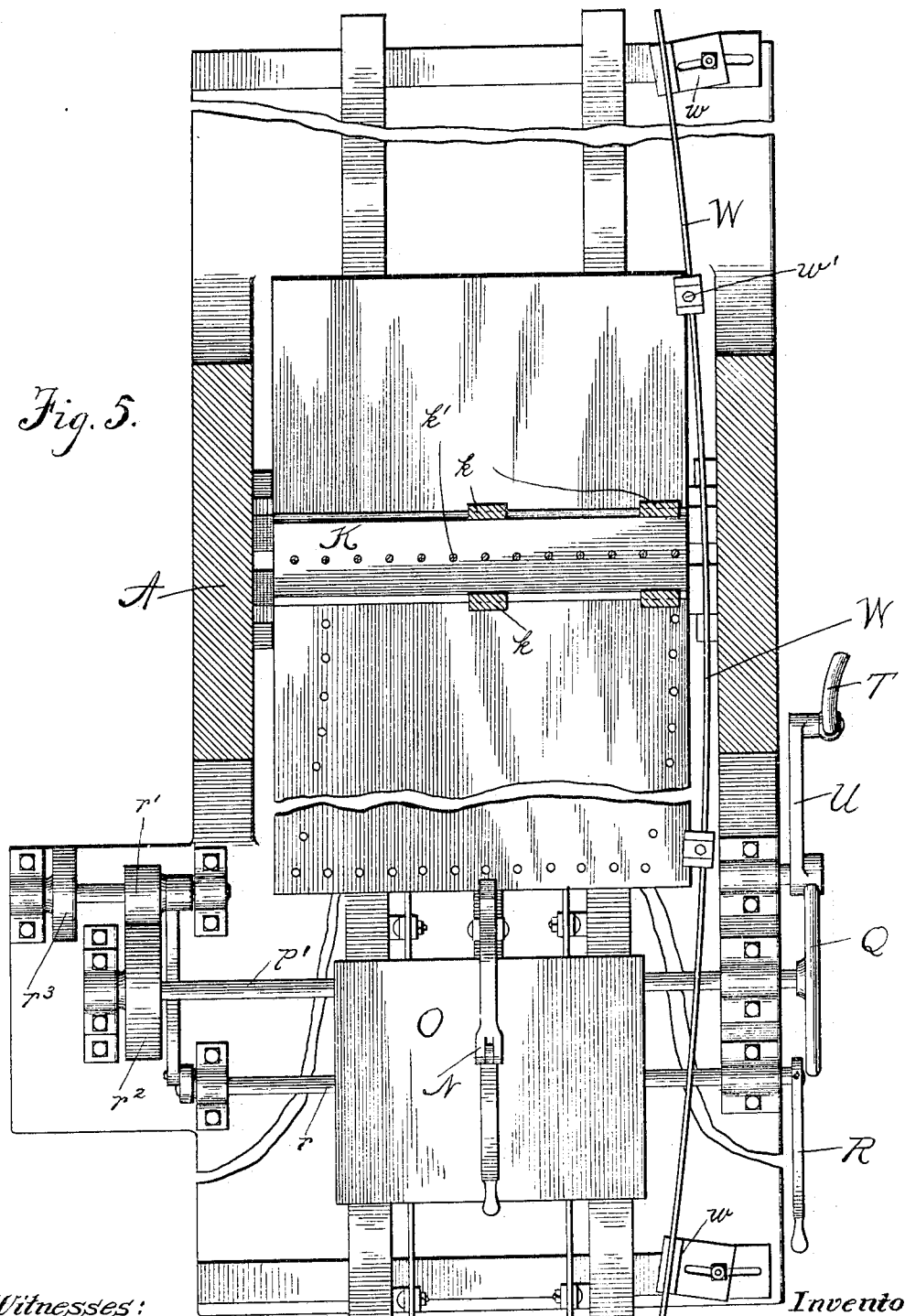

No. 793,051. PATENTED JUNE 27, 1905.
G. B. CHAPMAN.
PUNCHING MACHINE.
APPLICATION FILED APR. 3, 1902.

7 SHEETS—SHEET 6.

Witnesses:
Ira D. Perry
J B Weir

Inventor:
George B. Chapman,
By Charles E. Mize, his Atty

No. 793,051. PATENTED JUNE 27, 1905.
G. B. CHAPMAN.
PUNCHING MACHINE.
APPLICATION FILED APR. 3, 1902.
7 SHEETS—SHEET 7.
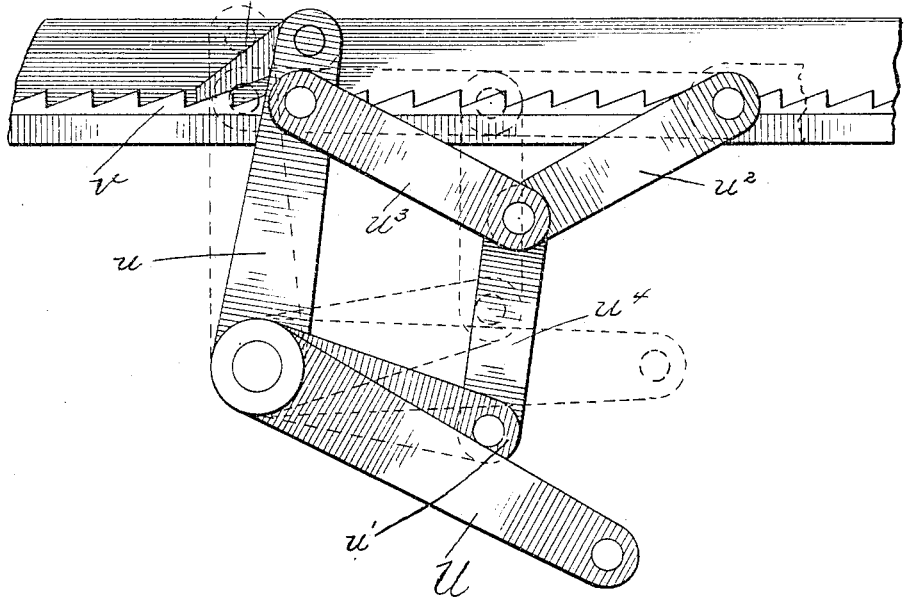
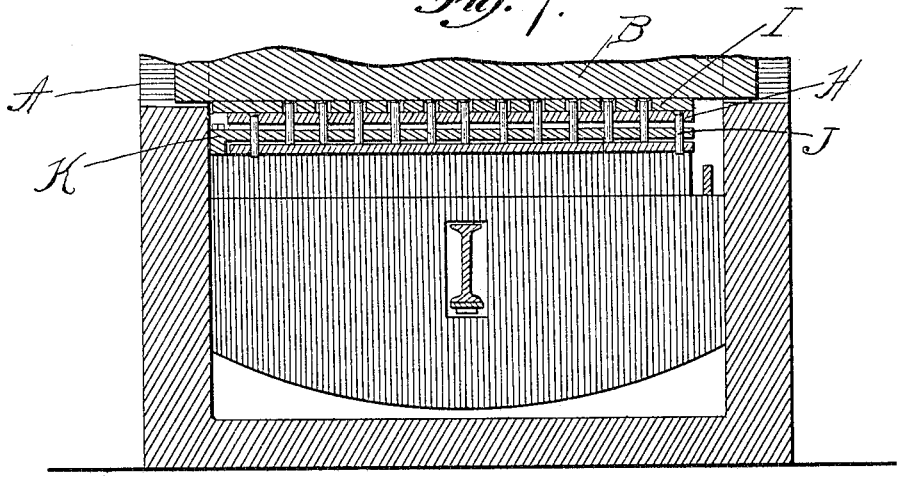

No. 793,051.  
Patented June 27, 1905.

UNITED STATES PATENT OFFICE.

GEORGE B. CHAPMAN, OF CHICAGO, ILLINOIS.

PUNCHING-MACHINE.

SPECIFICATION forming part of Letters Patent No. 793,051, dated June 27, 1905.

Application filed April 3, 1902. Serial No. 101,208.

*To all whom it may concern:*

Be it known that I, GEORGE B. CHAPMAN, of Chicago, Cook county, Illinois, have invented certain new and useful Improvements in Punching-Machines, of which the following is a specification.

This invention relates to metal-punching machines, and while the improvements have been devised with special reference to machines intended for punching successive rows of holes and so exemplified they will be found capable of more general application in metal-punching machines.

Referring to the accompanying drawings, wherein like reference-letters indicate the same or corresponding parts, Figure 1 is a plan view, and Fig. 2 a side elevation, (both in part broken away,) of a punching-machine equipped with my improvements. Fig. 3 is an end view, Fig. 4 a longitudinal sectional view, Fig. 5 a view taken on the line 5 5 of Fig. 4, and Fig. 6 a cross-sectional view, of certain of the parts of the punching-machine shown in Figs. 1 and 2. Fig. 7 is a cross-sectional view of a portion of the parts shown in Fig. 6; Fig. 8, a detail view hereinafter more fully described; Fig. 9, a side elevation of the gripper N, the parts thereof being shown in open position. Fig. 10 is a sectional view taken on the line 10 10, Fig. 1, looking in the direction of the arrows and showing the means for controlling the combined pressure and releasing bar and adjacent parts; and Fig. 11 is a fragmentary view, in side elevation, showing a bell-crank lever which may be substituted for the spring-plate and elevating means L shown in Fig. 4.

Referring to the drawings, wherein the improvements constituting my invention are shown in connection with what is in other respects a common type of punching-machine adapted to punch a row of holes, A indicates the usual frame or housings of the machine; B, the usual vertically-reciprocating slide which carries the punches; C, the usual cam-shaft, whose rotations cause the reciprocating movement of the slide and punches through the medium of the eccentrics D and pitmen E; F, a die removably secured in the usual manner to the die-block G and provided with holes in connection with which the punches operate to perform their work; H, a punch-holder removably and adjustably secured by means of the bolts $h$ or other suitable securing means to and beneath the slide and moving therewith; I, a combined pressure and releasing bar interposed and horizontally movable between the punch-holder and the lower edge of the slide and vertically movable therewith and provided with an aperture or apertures $i$, which may be made to register with one or more of the punches, thus rendering said punches inoperative, because when the punches are moved downwardly to punch the plate the punches registering with said holes will be forced upwardly therein instead of being driven through the plate; $i'$, a lever adapted to control the horizontal movement of the combined pressure and releasing bar, (which in turn controls the punches, as described,) fulcrumed at $i^2$ and engaging the member I at $i^3$; J, punches passing through suitable apertures $j$ in the punch-holder and provided with means, as the heads $j'$, limiting their downwardly-vertical movement; K, a combined stripper and punch-guide, rigidly but removably supported immediately above the die in any suitable manner, as by the hangers $k$, and provided with holes or guides $k'$, wherein the punches will readily move; L, a spring adapted to bear upwardly against the sheet or plate M and to lift it from contact with the face of the die when the punches are upwardly withdrawn from the holes created by them, said spring being of such strength as to lift the plate a sufficient distance from the face of the die that the fins created on the under side of the plate by the punches will clear the die when the plate is moved in order to bring it into position to be again punched. It follows, therefore, that the stripper should be of such distance from the face of the die as to admit of the plate being so moved upwardly by the spring.

N is a tong-like gripper, the lower arm $n$ of which is pivotally secured to the movable carriage O, by means of the pivot bolt or pin O', preferably in such manner that its lower gripping-face will lie on a plane with the upper surface of the die, while the upper jaw $n'$ is secured to and movably controlled by the toggle-operating lever $n^2$ and link $n^3$, the parts of the gripper being shown in Figs. 2 and 9 in respectively open and closed position; P, a rack-bar secured to or forming a part of and moving with the carriage; $p$, a gear-wheel mounted on a shaft $p'$ and meshing with the teeth of the rack-bar; Q, a hand-wheel controlling the gear-shaft to cause the carriage and rack-bar to be moved in either direction of the punches; R, a lever connected to the crank-shaft $r$ and controlling the friction-pulley $r'$ in such manner as to throw it into or out of contact with the friction-pulley $r^2$ to cause the gear-shaft and gear to be revolved by the pulley $r^3$, which pulley may be controlled by a belt from the power-wheel $r^4$, a counter-shaft, or other suitable power means, the rotation of the gear-shaft and gear in one or the other direction causing the carriage to be moved respectively in a direction toward or away from the punches; S, a feed-crank of adjustable stroke mounted upon the cam-shaft; T, a connecting-rod extending from this crank to the lever U, which lever controls the pawl-lever $u$ through the medium of the levers $u'$ $u^2$ and links $u^3$ $u^4$; V, a pawl controlled by the pawl-lever U and adapted when moved in one direction by its controlling-lever to engage the teeth on the rack-bar $v$ and move said bar and the carriage and when moved in the opposite direction to engage the rack-bar at a different point thereon, the movement in the one or the other direction being occasioned by the rise or dip of the lever U, controlled by the feed-crank; W, a guide-bar formed of more or less flexible material; $w$, movable guide-bar-securing means whereby said guide-bar may be retained in a straight or any desired position; $w'$, gripping means adapted to slide upon the plate guide-bar and to engage the plate being or to be punched and cause it in moving to take the line of direction of the bar, thus controlling the line of direction of the holes made in the plate by the punches. Any suitable means, as the lever-controlled clutch X, may be employed to throw the power-wheel into or out of operative connection with the cam-shaft.

In Fig. 6 the member I is shown in position to render all of the punches effective, while in Fig. 7 said member is shown in such position that all save the two outer punches are rendered ineffective by reason of the fact that they register with the holes in said member and immediately above them.

In Fig. 10, which is a sectional view taken lengthwise of the machine through the combined pressure and releasing bar and adjacent parts, I have shown one method of controlling the movement of said bar. In said figure $i'$ is a lever pivoted to a suitable bolt or rivet $i^2$ and engaging a slot $i^3$ in the pressure-bar I. If the outer end of the lever $i'$ be moved in one direction, its other end will be moved in the opposite direction, and said last-mentioned end being in engagement with the pressure-bar will move it in a similar direction.

In Fig. 11, Y is an angle or bell-crank lever pivoted to the frame of the machine at any suitable point, $y'$ a wheel revolubly secured to one of the arms of said lever, and $y$ a weight adapted to slide upon the other arm of said lever and to raise the first-mentioned arm. The purpose of said lever and weight is to hold the stock upwardly against the lower face of the stripper K and away from the upper face of the die, thereby accomplishing the same results as accomplished by the spring L. By moving the weight $y$ upon the lever-arm which carries it the pressure of the wheel attached to the other arm of the lever upon the stock will be varied. If the stock to be lifted is heavy, the weight may be shifted outwardly, thus increasing the leverage, while if it be light it may be moved inwardly toward the fulcrum-point, thereby diminishing the leverage and resultant pressure upon the stock.

It is obvious that the member I may be of any suitable length and form and provided with a few or many punch-registering holes $i$; that any suitable means, of which the lever $i''$ and its connections constitute but one, may be employed to control the horizontal movement of the member I; that there may be as many springs L as desired, which springs may be of any suitable form; that the stripper need not of necessity be removably retained in place, but I prefer that it should be so retained; that there may be one or more guide-bars each formed of one or more pieces of suitable metal and situated at any desired point; that any suitable guide-bar adjusting and retaining means $w$ may be employed; and it is further obvious that the number, size, and form of the various parts of my device may be greatly varied without departing from the principle of the invention.

Having thus described my invention, what I claim as new, and desire to secure by Letters Patent, is—

1. In a punching-machine, the combination with the punching parts, of a carriage reciprocating in a straight line for moving the plate to be punched, a flexible guide-bar for controlling the position of the plate relatively to the carriage, and means for fixing the contour of said guide-bar.

2. In a punching-machine, the combination with the punching parts, of a carriage reciprocating in a straight line for moving the plate to be punched, a guide-bar, and gripping means for engaging the plate and traveling on said guide-bar to control the position of the plate relatively to the carriage.

3. In a punching-machine, the combination with the punching parts, of a carriage reciprocating in a straight line for moving the plate to be punched, a single guide-bar located at the side of the path of the carriage, and gripping means engaging the plate and traveling on said guide-bar to control the position of the plate relatively to said carriage.

4. In a punching-machine, the combination with the punching parts, of a carriage reciprocating in a straight line for moving the plate to be punched, a flexible guide-bar, means for fixing the contour of said bar, and gripping means engaging the plate and traveling on said guide-bar to control the position of the plate relatively to the carriage.

5. In a punching-machine, the combination with the punching parts, of a carriage reciprocating in a straight line, a gripper pivoted to the carriage in advance of the plate to be punched, said gripper being adapted to pull said plate forward between the punching parts, and a guide-bar for controlling the position of the plate relatively to the carriage.

6. In a punching-machine, the combination with the punching parts, of a carriage reciprocating in a straight line, a gripper pivoted to the carriage in advance of the plate to be punched, said gripper being adapted to pull said plate forward between the punching parts, a flexible guide-bar for controlling the position of the plate relative to the carriage, and means for controlling the contour of said guide-bar.

7. In a punching-machine, the combination with the punching parts, of a carriage reciprocating in a straight line, a straight rack-bar, a pawl device engaging said rack-bar for operating the carriage, means for pivotally securing the plate to be punched to the carriage, a flexible guide-bar for controlling the position of the plate relatively to the carriage, and means for fixing the contour of said guide-bar.

GEORGE B. CHAPMAN.

Witnesses:
 TILLIE FISS,
 J. B. JOHNSTON,
 M. H. CHAPMAN.